United States Patent [19]

Marquot

[11] Patent Number: 4,837,744

[45] Date of Patent: Jun. 6, 1989

[54] INTEGRATED CIRCUIT OF THE LOGIC CIRCUIT TYPE COMPRISING AN ELECTRICALLY PROGRAMMABLE NON-VOLATILE MEMORY

[75] Inventor: Alexis Marquot, Saint Maximin, France

[73] Assignee: Thomson Semiconducteurs, Paris, France

[21] Appl. No.: 116,692

[22] Filed: Nov. 4, 1987

[30] Foreign Application Priority Data

Nov. 4, 1986 [FR] France .................... 86 15325

[51] Int. Cl.$^4$ ............................................ G11C 7/00
[52] U.S. Cl. .................................... 365/195; 365/222
[58] Field of Search ............... 365/189, 230, 233, 185, 365/194, 222

[56] References Cited

U.S. PATENT DOCUMENTS 4,337,525  6/1982  Akatsuka ........................ 365/233
4,710,900 12/1987  Higuchi .......................... 365/189

FOREIGN PATENT DOCUMENTS 8301848  5/1983  PCT Int'l Appl. .
8403011  8/1984  PCT Int'l Appl. .

Primary Examiner—Joseph A. Popek
Attorney, Agent, or Firm—Oblon, Spivak, McClelland, Maier & Neustadt

[57] ABSTRACT

An integrated circuit of the logic circuit type includes a matrix of memory cells of the floating-gate transistor type, write and read circuits and circuitry to handle the interconnection of these circuits with the memory. The integrated circuit receives a general supply voltage Vcc, a programming voltage Vpp and an external clock signal divided into two complementary clock signals. The clock signals acts on, among others, the functioning of the write circuits. The integrated circuit further includes a circuit to detect the presence of internal clock signals. The circuit sends a signal prohibiting write operations in the memory when it detects the absence of one of the internal clock signals.

8 Claims, 1 Drawing Sheet

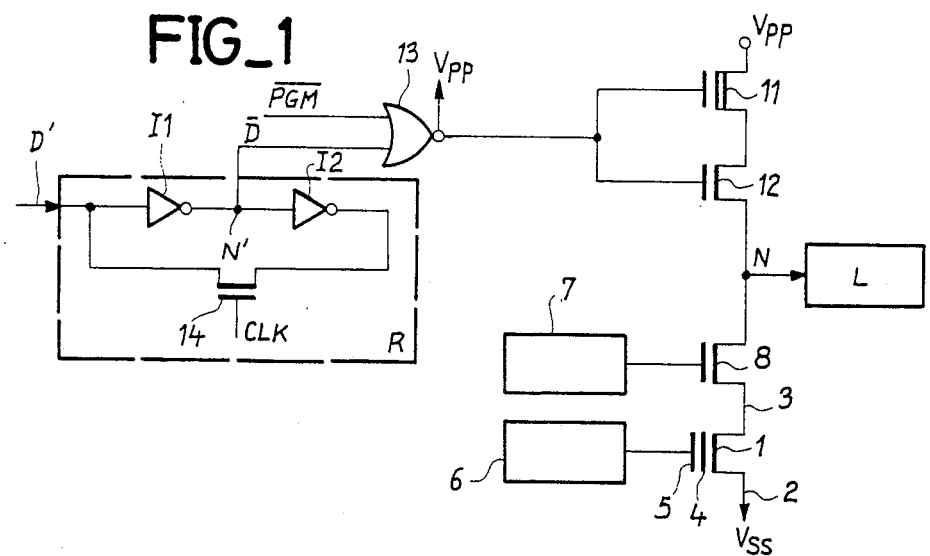
FIG_1
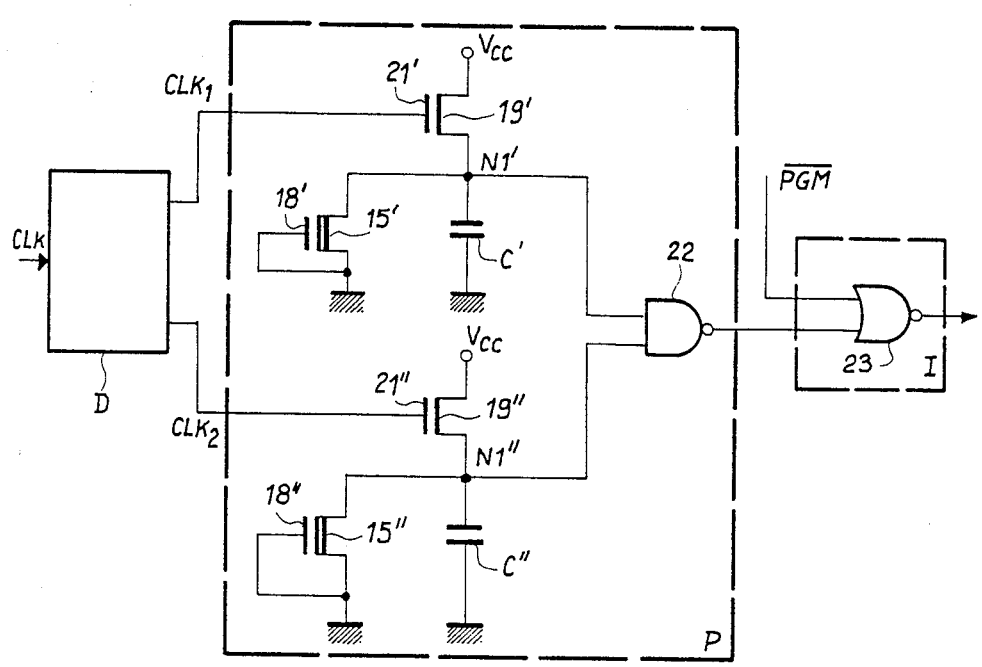
FIG_2

INTEGRATED CIRCUIT OF THE LOGIC CIRCUIT TYPE COMPRISING AN ELECTRICALLY PROGRAMMABLE NON-VOLATILE MEMORY

BACKGROUND OF THE INVENTION

1. Field of the Invention

The present invention pertains to an integrated circuit of the logic circuit type comprising an electrically programmable non-volatile memory. It pertains more specifically to an integrated circuit in which the electrically programmable non-volatile memory consists of an EPROM or EEPROM type memory. Circuits of this type are used, for example, in memory cards also known as CCCs. In this case, the non-volatile memories are most usually designed to receive non-modifiable confidential information which should not be subjected to spurious programming caused by abnormal conditions in the functioning of the card.

2. Description of the Prior Art

Now, in EPROM or EEPROM type memories currently available in the market, each data storage element or memory cell comprises a floating-gate MOS transistor. This type of transistor may have two states. Thus, for an N-channel MOS transistor, in a first state, no charge is trapped at the floating gate. There may be a conduction channel between the source and the drain. The transistor is then conductive and behaves like a closed switch. In a second state, the electrons have been trapped at the floating gate. They prevent the creation of a conduction channel in the substrate between the source and the drain. In this case, the transistor is off and behaves like an open switch.

To programme or read a floating-gate MOS transistor of the type described above, it should be possible to apply several voltages to the various electrodes of the transistor. These voltages are applied by means of read and write circuits controlled by specific signals.

Thus, as shown in FIG. 1, which pertains to an EPROM memory, the memory cell 1 of which consists of a SAMOS (stacked gate avalanche injection MOS) type floating-gate transistor, each floating-gate transistor 1 comprises two main electrodes, 2 and 3 respectively, and a control gate 5 stacked on the floating-gate 4. In the case of a memory, the floating-gate transistors 1 constituting memory cells are connected in matrix form. Thus, a first main electrode 2, or source in the technology used, is connected to a voltage Vss corresponding to the ground while the other electrode 3 or drain is connected by a bits line (not shown) and a MOS transistor 8, which forms a switch, to a column address decoder 7. The control gate 5 is connected by another connection, called a word line (not shown), to a row address decoder 6.

More specifically, the column address decoder 7 is connected to the gate of the transistor 8, having its source connected to the electrode 3 of the floating-gate MOS transistor 1 while its other electrode or drain is connected by a load line, comprising MOS transistors 11 and 12, to the programming voltage Vpp. In fact, the load line is made up of a depleted MOS 11 transistor, the drain of which is connected to Vpp and the source of which is connected to the drain of an enhanced MOS transistor 12, the two gates of the transistors 11 and 12 being connected together and to a write control circuit comprising a NOR gate 13 supplied by the voltage Vpp. The NOR gate 13 respectively receives, at its input, the inverted programming control signal $\overline{PGM}$ and the inverted datum to be programmed $\overline{D}$. The signal $\overline{D}$ comes from a dynamic register R of a known type. This register R can be used for data storage and data refreshing. More specifically, it receives, at its input, data to be written in the form of the logic level "1" or "0". It comprises essentially storage means formed by capacitors (not shown) designed to be placed before two inverters I1 and I2 and one MOS transistor 14, forming a switch, connected between the output of the inverter I2 and the input of the inverter I1. This transistor is controlled by the signal CLK representing the clock signal of the memory. This MOS transistor 14 is used for data refreshing. Thus, at the output of the inverter I1, namely at the node N', the datum $\overline{D}$ is obtained and is sent to the input of the NOR gate 13.

Furthermore, the node N between the source of the MOS transistor 12 and the drain of the MOS transistor 8 is connected to a read amplifier represented by the block L.

The functioning of the write circuit described above is essentially dynamic. Thus, the datum D in input of the register R is stored in the form of a load at a high impedance node, and this storage is refreshed regularly by using the clock signal CLK. If this storage is not refreshed, the datum D is lost and the write circuit will behave in a completely unpredictable way. Now, if the integrated circuit is used in memory cards for example, certain zones of the non-volatile memory are reserved, i.e. their writing is strictly checked and most often subjected to the recognition of a secret code. However, with the write circuit described above, if the user sends pulses to the programming voltage Vpp supply, while the voltage Vcc is present but the clock signal CLK is absent, spurious programmings are observed in the non-volatile memory, even in the reserved zones themselves. The reserved zones are then programmed quite randomly.

3. Summary of the Invention

An object of the present invention is to remove these advantages to enable non-supervised writing in an electrically programmable non-volatile memory.

Consequently, an object of the present invention is an integrated circuit of the logic circuit type, comprising an electrically programmable non-volatile memory, consisting of a matrix of memory cells of the floating-gate transistor type, read and write circuits and means to handle the interconnection of these circuits with the memory, the integrated circuit receiving a general supply voltage Vcc, a programming voltage Vpp and an external clock signal divided into two complementary internal clock signals, the said clock signals acting on, among others, the functioning of the write circuits, the said integrated circuit further comprising a circuit to detect the presence of internal clock signals, sending a signal prohibiting write operations in the memory when it detects the absence of one of the internal clock signals.

According to a preferred embodiment, the detection circuit consists of a first circuit comprising a capacitor and a resistor which are parallel mounted between the ground and a common node, the capacitor being regularly charged by means of one of the two internal clock signals, and a second circuit comprising a capacitor and a resistor, parallel-mounted between the ground and a common node, the capacitor being regularly charged by means of the other internal clock signal, the common nodes being connected respectively to each input of a NAND gate, the output of which gives a logic signal indicating the presence or absence of the external clock signal.

Preferably, the output of the detection circuit is connected to the input of a gate, the other input of which receives a signal essential to the write command so as to inhibit the writing operation if the external clock signal is absent.

BRIEF DESCRIPTION OF THE DRAWINGS

Other characteristics and advantages of the present invention will emerge from the following description of various embodiments, made with reference to the appended drawings, of which:

FIG. 1, already described, gives a schematic view of a memory cell of an EPROM memory connected to its write and read circuits as well as to means handling the interconnection between the memory cell and the write and read circuits, and FIG. 2 gives a schematic view of an embodiment of a detection circuit according to the present invention.

DESCRIPTION OF A PREFERRED EMBODIMENT

To simplify, the description, the same elements carry the same references in the drawings. Furthermore, the description has been made with reference to MOS circuits made according to NMOS technology and to an EPROM memory, the memory cells of which consist of transistors of the floating-gate SAMOS (stacked gate avalanche injection MOS) type. It is obvious to the specialist that the present invention can be used with other technologies and other types of EPROM or EEPROM memories.

Generally, in integrated circuits of the memory card type, using electrically programmable non-volatile memories of the EPROM type, not just one clock signal CLK, but two complementary clock signals CLK1 and CLK2, coming from the clock signal CLK, are used. The clock signals CLK1 and CLK2 are obtained by sending the external clock signal CLK to a divider D which gives two complementary signals CLK1 and CLK2 at its output.

In this case, the detection circuit according to the present invention may be of the type shown in FIG. 2. This detection circuit P consists of two identical circuits, each detecting the presence or absence of one of the internal clock signals CLK1, CLK2, the outputs of which are sent to a NAND gate 22. More specifically, the signals CLK1 and CLK2, obtained at the output of the divider 3 from the external clock signal CLK, which is applied to one of the inputs of the integrated circuit, are each sent to the gates 21′ and 21″ of the switch-forming MOS transistors 19′ and 19″ of the first and second identical circuits which form the detection circuit P with the gate 22. The first circuit is made by mounting a capacitor C′ in parallel, with a resistor made by a MOS transistor 15′. The transistor 15′ consists of a load-connected depleted transistor, namely a transistor which has its gate 18′ connected to the source. The capacitor C′ and the transistor 15′ are mounted between the voltage Vss, forming the ground and the common node N1′. Furthermore, the node N1′ is connected to the supply voltage Vcc by means of the switch-forming MOS transistor 19′, the said MOS transistor 19′ receiving the clock signal CLK1 at its gate 21′. The output of the first circuit is obtained at the node N1′ and is sent to one of the inputs of the NAND gate 22. Similarly, the second circuit comprises a capacitor C″ and a resistor made by a MOS transistor 15″, mounted in parallel. The transistor 15″ is a load-connected depleted transistor, i.e. having its gate 18″ connected to the source. The capacitor C″ and the MOS transistor 15″ are connected between the voltage Vss forming the ground and the common node N1″. The node N1″ is connected to the supply voltage Vcc by means of the switch-forming MOS transistor 19″, the said MOS transistor receiving the clock signal CLK2 at its gate 21″. Furthermore, the node N1″, forming the output of the second detection circuit, is connected to the other input of the NAND gate 22.

FIG. 2 also shows a circuit which can be used to inhibit write operations in an electrically programmable non-volatile memory, by using the output signal of the NAND gate 22. This inhibition circuit I consists of a NOR gate 23 which receives the output signal of the NAND gate 22 at one of its inputs and the inverted programming control signal $\overline{PGM}$ at its other input.

We shall now explain the working of the circuit of FIG. 2. In fact, the first and second circuits included in the detection circuit P work identically. Thus, when the two signals CLK1 and CLK2, consisting of pulses, are present, the capacitors C′ and C″ are charged regularly at each change-over to the logic level "1". At the nodes N1′ and N1″, a voltage is obtained which substantially corresponds to the logic level "1". Furthermore, the charges present in the capacitors C′ and C″ are discharged in direct mode towards the voltage Vss representing the ground through the load-connected transistors 15′ and 15″. To prevent the voltage at the nodes N1′ and N1″ from switching over between a logic level "1" and a logic level "0", the time constant for the discharging of the circuits, each formed by the capacitor C′ or C″ and the load-connected MOS transistor 15′ or 15″, is greater than the cycle of the clock signals CLK1 and CLK2. Consequently, since the nodes N1′ and N1″ are at the logic level "1", the output of the NAND gate 22 is at the logic level "0". As a result of this, at the output of the NOR gate 23, a signal is obtained corresponding to the programming control signal $\overline{PGM}$. If the clock signal CLK is absent, the two clock signals CLK1 and CLK2 are no longer pulses but steady signals, and one of the two clock signals CLK1 or CLK2 is at a logic level "0". Consequently, one of the switch MOS transistors 21′ or 21″ is on and the voltage at one of the nodes N1′ or N1″ corresponds to a logic level "0". In this case, the output of the NAND gate is at the logic level "1", resulting in a logic level "0" at the output of the NOR gate 23, whatever the level of the signal $\overline{PGM}$. The result of this is an inhibition of the write operation in the electrically programmable non-volatile memory.

The advantage of the circuit described above is that it prevents any random programming of an electrically programmable non-volatile memory, designed chiefly to receive confidential data, and that it does so when working outside normal supply voltage and clock signal conditions. This circuit is furthermore, very simple in its design, requires little space and works very reliably.

It is obvious to the specialist that the present invention can be applied to any integrated circuit comprising memories for which the programming of a memory cell is done in the same way as in the EPROM or EEPROM memories of the floating-gate transistor type, and in which the supply voltages and clock signal terminals can be easily accessed from the outside.

What is claimed is:

1. An integrated circuit comprising an electrically programmable non-volatile memory, said circuit comprising means for periodically refreshing data to be written in the memory, means for supplying a periodical clock signal to the refreshing means, and means for applying a write control signal to the memory for enabling writing said data in the memory, wherein said integrated circuit further comprises a circuit for detecting an absence of said periodical clock signal, and means coupled to said detect circuit for inhibiting transmission of said write control signal to the memory when an absence of periodical clock signal is detected by said detect circuit.

2. An integrated circuit according to claim 1, wherein said detect circuit comprises an input for receiving said periodical clock signal and another input for receiving the logic complement of said clock signal, said detect circuit further comprising a first resistive and capacitive circuit and a second resistive and capacitive circuit, means controlled by said periodical clock signal for periodically charging said first resistive and capacitive circuit, means controlled by said complementary clock signal for periodically charging said second resistive and capacitive circuit, and a gate having two inputs, each input connected to a respective resistive and capacitive circuit, said gate having an output connected to said means for inhibiting transmission of the write control signal.

3. An integrated circuit according to claim 2 wherein each of said resistive and capacitive circuit comprises a capacitor in parallel with a MOS transistor having its gate connected to one of its main electrodes.

4. An integrated circuit according to claim 3, wherein said MOS transistor is a depleted channel transistor having its gate connected to its source.

5. An integrated circuit according to claim 2, wherein said resistive and capacitive circuit is connected to a supply voltage through a MOS transistor, the gate of which receives a corresponding one of said clock signal and complementary clock signal.

6. An integrated circuit according to claim 2, wherein each of said resistive and capacitive circuits has a discharging time constant greater than the period of said periodical clock signal.

7. An integrated circuit according to claim 1, wherein said inhibiting means is a gate having a first input for receiving the output of said detect circuit and a second input for receiving the write control signal.

8. An integrated circuit according to claim 1, wherein said memory contains protected information which should not be overwritten by a user.

* * * * *